(12) United States Patent
Ogata (10) Patent No.: US 8,429,727 B2
(45) Date of Patent: Apr. 23, 2013

(54) AUTHENTICATION CONTROL APPARATUS AND AUTHENTICATION CONTROL METHOD

(75) Inventor: Shingo Ogata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 708 days.

(21) Appl. No.: 12/320,921

(22) Filed: Feb. 9, 2009

(65) Prior Publication Data

US 2009/0210925 A1 Aug. 20, 2009

(30) Foreign Application Priority Data

Feb. 20, 2008 (JP) .............................. 2008-038827

(51) Int. Cl.
*G06F 7/04* (2006.01)
(52) U.S. Cl.
USPC ............ 726/6; 726/1; 726/2; 726/22; 726/26; 380/247; 380/248; 380/249; 380/250; 709/225; 713/186; 382/115
(58) Field of Classification Search ................ 726/1–33; 713/168, 186; 380/247–250; 382/115; 709/225
See application file for complete search history.

(56) References Cited

U.S. PATENT DOCUMENTS

| | | | |
|---|---|---|---|
| 7,627,505 B2 * | 12/2009 | Yoshida et al. .................. | 705/34 |
| 7,707,414 B2 * | 4/2010 | Nishio ........................... | 713/168 |
| 2003/0158815 A1 | 8/2003 | Yoshida et al. | |
| 2005/0024674 A1 | 2/2005 | Fujishige et al. | |
| 2006/0021003 A1* | 1/2006 | Fisher et al. ....................... | 726/1 |
| 2006/0041507 A1 | 2/2006 | Novack et al. | |

FOREIGN PATENT DOCUMENTS

| | | |
|---|---|---|
| EP | 1 043 648 | 10/2000 |
| JP | 2005-267448 | 9/2005 |
| JP | 2007-048079 | 2/2007 |
| JP | 2007-109219 | 4/2007 |

OTHER PUBLICATIONS

Vipin Samar. "Unified Login with Pluggable Authentication Modules." Mar. 14, 1996, 3rd ACM Conference on Computer and Communications Security. New Delhi, Mar. 14-16, 1996, pp. 1-10.
Xerox Corporation. "Xerox Secure Access Unified ID System." Jan. 1, 2006, retrieved from the Internet: http://www.office.xerox.com/latest/SOLBR-26.pdf.
European Search Report dated Jun. 23, 2009.
European Communication dated Jul. 20, 2010 for corresponding European Patent Application.
Japanese Office Action dated May 29, 2012, issued in Japanese patent Application No. 2008-038827.

* cited by examiner

*Primary Examiner* — Christopher J Brown
*Assistant Examiner* — Roderick Tolentino
(74) *Attorney, Agent, or Firm* — Harness, Dickey & Pierce, P.L.C.

(57) ABSTRACT

An authentication control apparatus is disclosed that includes plural authentication units that perform authentication for an operator with different authentication methods; a corresponding information management unit that manages corresponding information between the mode of an authentication request and the authentication unit to be used; and an authentication control unit that determines the authentication unit corresponding to the mode of the authentication request based on the corresponding information in response to the authentication request from the operator and causes the determined authentication unit to execute the authentication for the operator.

7 Claims, 12 Drawing Sheets

| AUTHENTICATION MODULE A | ACTIVE |
|---|---|
| AUTHENTICATION MODULE B | INACTIVE |
| AUTHENTICATION MODULE C | AVAILABLE |
| AUTHENTICATION MODULE D | NOT AVAILABLE |

| USER IDENTIFICATION INFORMATION | AUTHENTICATION MODULES |
|---|---|
| 001 | AUTHENTICATION MODULE A<br>AUTHENTICATION MODULE B |
| 002 | AUTHENTICATION MODULE A<br>AUTHENTICATION MODULE B<br>AUTHENTICATION MODULE C |
| 003 | AUTHENTICATION MODULE A<br>AUTHENTICATION MODULE B<br>AUTHENTICATION MODULE D |

FIG.10

| TIME ZONES | AUTHENTICATION MODULES |
|---|---|
| WEEKDAYS/DAYTIME | AUTHENTICATION MODULE A<br>AUTHENTICATION MODULE B |
| WEEKDAYS/NIGHTTIME | "WEEKDAYS/DAYTIME"<br>+<br>AUTHENTICATION MODULE C |
| HOLIDAYS | "WEEKDAYS/NIGHTTIME"<br>+<br>AUTHENTICATION MODULE D |

FIG.12

AUTHENTICATION CONTROL APPARATUS AND AUTHENTICATION CONTROL METHOD

BACKGROUND OF THE INVENTION

1. Field of the Invention

The present invention generally relates to authentication control apparatuses, authentication control methods, and programs and, in particular, to an authentication control apparatus, an authentication control method, and a program that perform authentication for users.

2. Description of the Related Art

In recent years and continuing to the present, it is natural that companies acquire standards, specifications, etc., for information security. In addition, it is highly desired that the security of office automation equipment ordinarily used in the companies be ensured. In view of such circumstances, some image forming apparatuses (office automation equipment having the functions of a copier, a scanner, a facsimile machine, etc.) have an (built-in) authentication function for users (see, e.g., Patent Document 1).

Patent Document 1: JP-A-2005-267448

Although there are various authentication methods such as password authentication, IC-card authentication, and biometric authentication, the conventional authentication function uses the authentication methods in a fixed manner. In other words, the authentication methods can be selected at system construction. However, the authentication method selected at the system construction is applied to users or authentication situations in a fixed and unified manner.

SUMMARY OF THE INVENTION

The present invention has been made in view of the above drawbacks and may provide an authentication control apparatus, an authentication control method, and a program capable of improving the flexibility of an authentication function.

According to an embodiment of the present invention, there is provided an authentication control apparatus including plural authentication units that perform authentication for an operator with different authentication methods; a corresponding information management unit that manages corresponding information between the mode of an authentication request and the authentication unit to be used; and an authentication control unit that determines the authentication unit corresponding to the mode of the authentication request based on the corresponding information in response to the authentication request from the operator and causes the determined authentication unit to execute the authentication for the operator.

With the authentication control apparatus, it is possible to improve the flexibility of an authentication function.

According to embodiments of the present invention, it is possible to provide an authentication control apparatus, an authentication control method, and a program capable of improving the flexibility of an authentication function.

Other objects, features and advantages of the present invention will become more apparent from the following detailed description when read in conjunction with the accompanying drawings.

DETAILED DESCRIPTION OF THE PREFERRED EMBODIMENTS

Next, referring to the accompanying drawings, a description is made of embodiments of the present invention. In the embodiments, a multi-function machine is described as an example of an authentication control apparatus. A multi-function machine 1 is an image forming apparatus that performs the functions of a printer, a copier, a scanner, a facsimile machine, etc., in a single housing.

Figure 1:
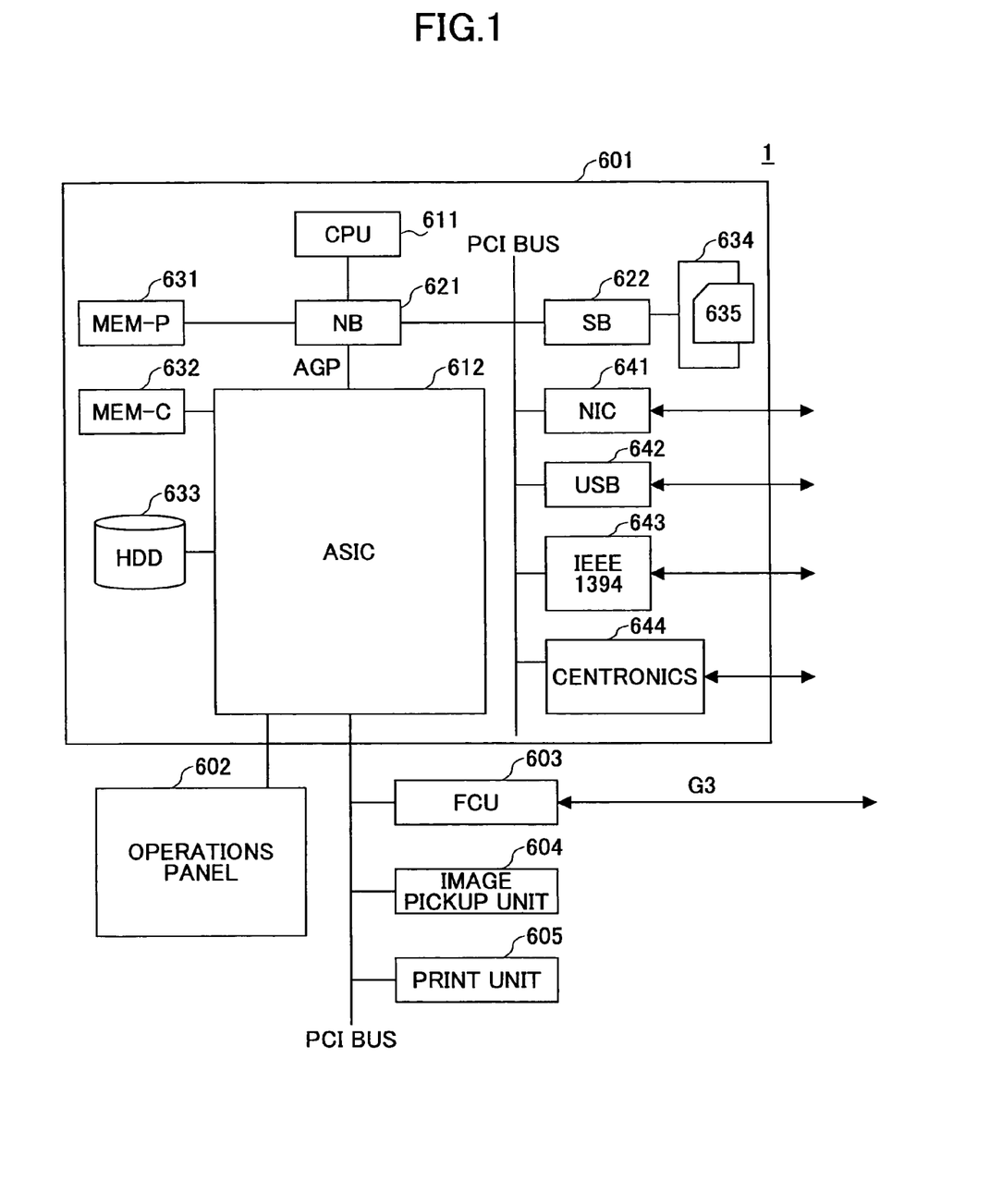
FIG. 1 is a diagram showing an example of the hardware configuration of a multi-function machine according to embodiments of the present invention.

FIG. 1 is a diagram showing an example of the hardware configuration of the multi-function machine according to the embodiments of the present invention. The hardware of the multi-function machine 1 includes a controller 601, an operations panel 602, a facsimile control unit (FCU) 603, an image pickup unit 604, and a print unit 605.

The controller 601 is composed of a CPU 611, an ASIC 612, a NB 621, a SB 622, a MEM-P 631, a MEM-C 632, a HDD (Hard Disk Drive) 633, a memory card slot 634, a NIC (Network Interface Controller) 641, a USB device 642, an IEEE1394 device 643, and a Centronics device 644.

The CPU 611 is an IC that processes various information items. The ASIC 612 is an IC that processes various images. The NB 621 stands for the north bridge of the controller 601. The SB 622 stands for the south bridge of the controller 601. The MEM-P 631 is the system memory of the multi-function machine 1. The MEM-C 632 is the local memory of the multi-function machine 1. The HDD 633 is the storage device of the multi-function machine 1. The memory card slot 634 is a slot that receives and holds the memory card 635. The NIC 641 is a controller for network communications using a MAC address. The USB device 642 is a device that provides the USB-compatible connection terminal. The IEEE1394 device 643 is a device that provides the IEEE1394-compatible connection terminal. The Centronics device 644 is a device that provides the Centronics-compatible connection terminal.

The operations panel 602 serves not only as hardware (operating device) through which an operator inputs data to the multi-function machine 1 but also as hardware (display device) through which the operator receives data output from the multi-function machine 1.

Figure 2:
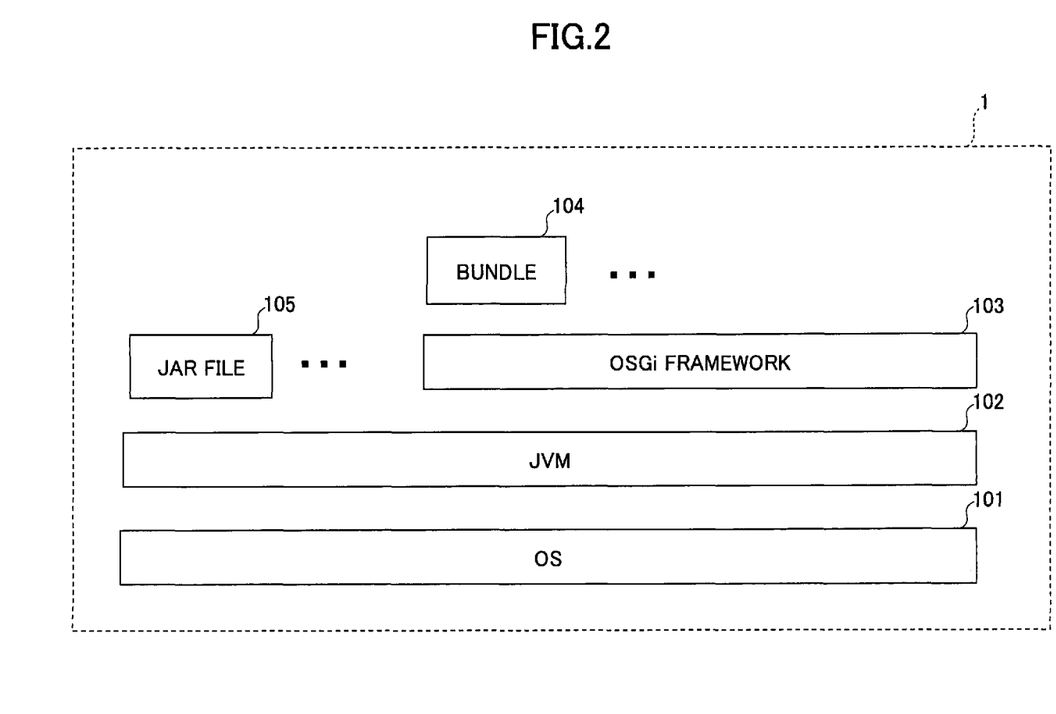
FIG. 2 is a diagram showing an example of the system requirements of the software of the multi-function machine according to the embodiments of the present invention.

FIG. 2 is a diagram showing an example of the system requirements of the software of the multi-function machine according to the embodiments of the present invention. As shown in FIG. 2, the software of the multi-function machine 1 is composed of an OS (Operating System) 101, a JVM (Java (registered trademark) Virtual Machine) 102, an OSGi (Open Services Gateway Initiative) framework 103, a bundle 104, a JAR (Java (registered trademark) Archive) file 105, etc.

The OS 101 is a so-called OS (Operating System). The JVM 102 converts Java (registered trademark) bytecode contained in the JAR file 105, the bundle 104, etc., into native code so as to be operable on the OS 101 and executes it. The OSGi framework 103 is standardization technology using the OSGi alliance and a software platform that provides an execution environment for software components generated based on open software component technology using the Java (registered trademark) language. On the OSGi framework 103, software in the Java (registered trademark) language is implemented in the form of a software component called a "bundle." One bundle is composed of one JAR (Java (registered trademark) Archive) file and may be separately dynamically installed without requiring the restart of the apparatus. The bundle 104 represents such a bundle. Note that plural of the bundles 4 may exist. The JAR file 105 represents the JAR file other than the bundle. In other words, the JAR file 105 directly operates on the JVM 102 without the intervention of the OSGi framework 103.

Note that the native code directly operating on the OS (Operating System) may also be implemented, but it is omitted in FIG. 2.

Thus, the multi-function machine 1 may operate a Java (registered trademark) program. The embodiments of the present invention describe an example in which an authentication function is realized using the JAAS (Java Authentication and Authorizing Service) as the authentication structure of the Java (registered trademark) standard. Note "authentication" in the embodiments of the present invention refers to authentication for an operator (i.e., user authentication) before the multi-function machine 1 is operated.

Figure 3:
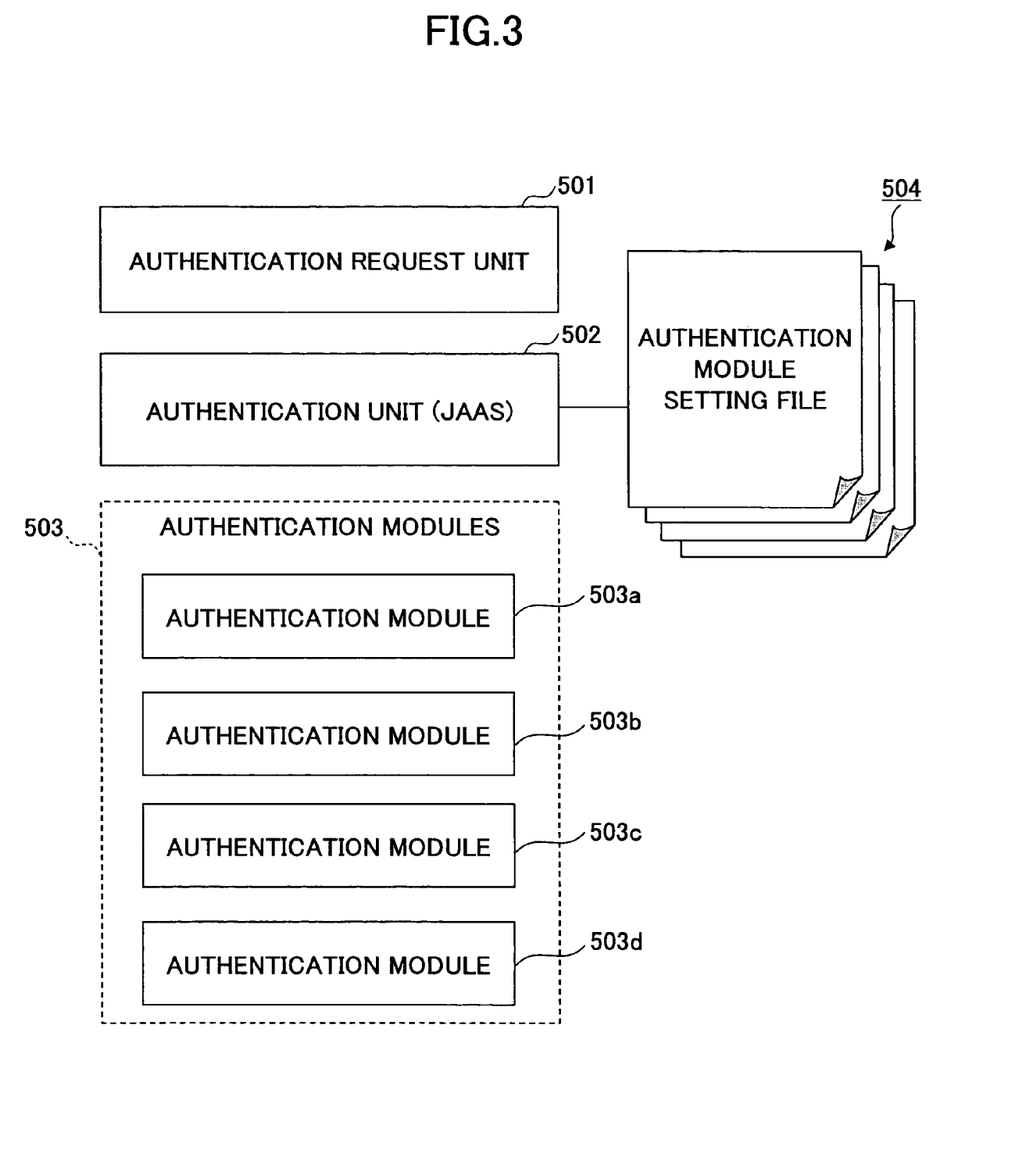
FIG. 3 is a diagram for illustrating the overview of the JAAS.

FIG. 3 is a diagram for illustrating the overview of the JAAS. In FIG. 3, an authentication request unit 501, an authentication unit 502, authentication modules 503, and an authentication module setting file 504 are shown. Among them, the authentication unit 502 corresponds to the JAAS. The JAAS (authentication unit 502) provides a framework (interface) related to the authentication function of the Java (registered trademark) standard and a part of the implementation of the framework. Actual authentication processing is implemented in the authentication module 503. The authentication module 503 is an individually implemented interface according to the JAAS and may be arbitrarily added as a plug-in. In other words, the authentication module 503 may expand an authentication function by implementing unique authentication processing. FIG. 3 exemplifies a case in which the four authentication modules 503 of authentication modules 503a, 503b, 503c, and 504d are incorporated.

The authentication request unit 501 requests authentication from the authentication unit 502 by invoking an interface provided by the authentication unit 502. The authentication module setting file 504 is a file generated in advance for each authentication module 13 and has information (information, etc., required for invoking the interface) related to the authentication module 503 described in a predetermined format.

Figure 4:
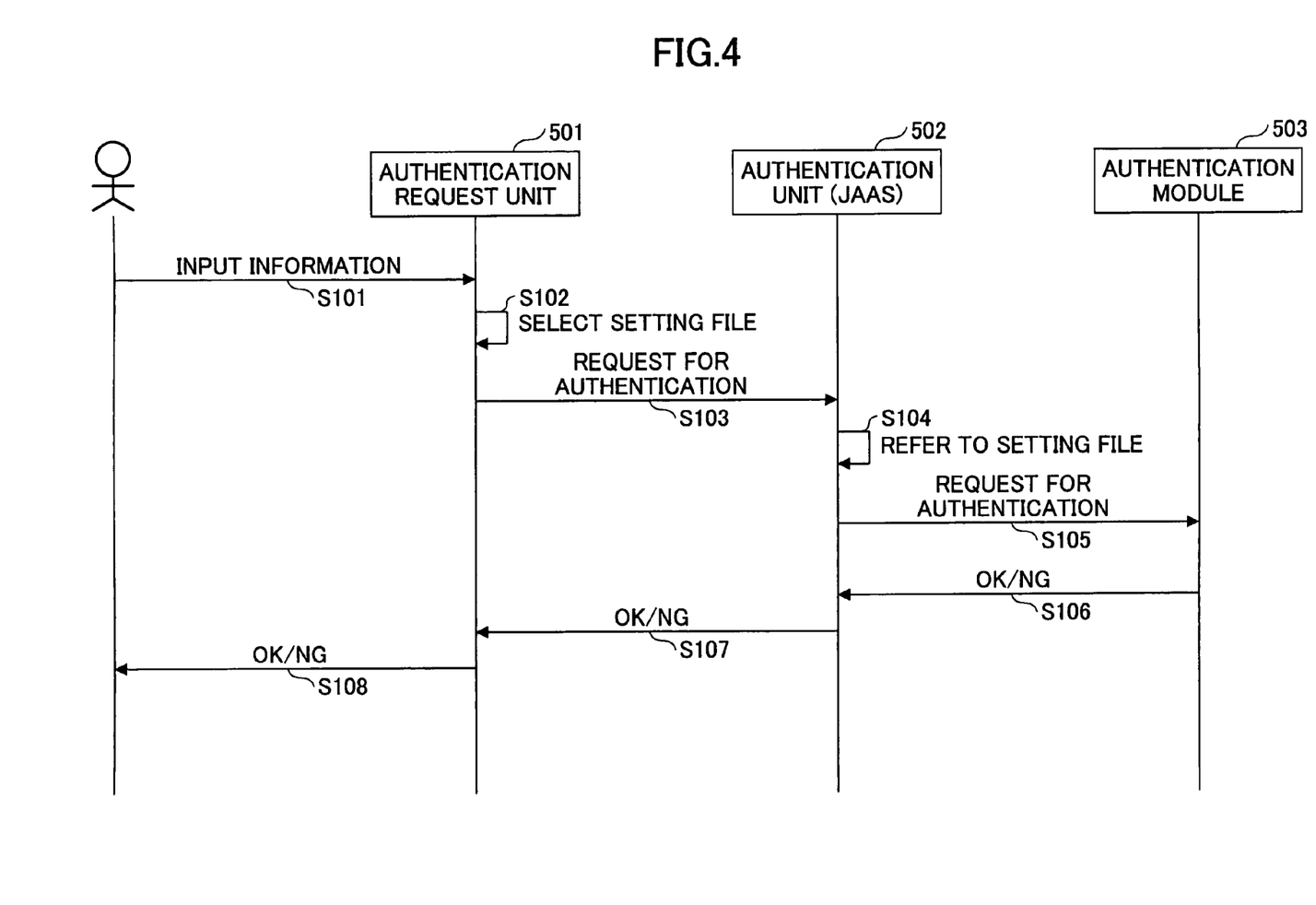
FIG. 4 is a sequence diagram for illustrating general authentication processing using the JAAS.

FIG. 4 is a sequence diagram for illustrating general authentication processing using the JAAS.

When the user inputs authentication information such as a user name and a password (S101), the authentication request unit 501 selects the authentication module setting file 504 corresponding to the authentication module 503 used for the authentication (S102). Next, the authentication request unit 501 requests the authentication from the authentication unit 502 (S103). In this case, authentication information input by the user, the file name of the authentication module setting file 504 selected by the authentication request unit 501, etc., are informed to the authentication unit 502.

Then, the authentication unit 502 refers to the authentication module setting file 504 related to the informed file name (S104). Next, the authentication unit 502 requests the authentication from the authentication module 503 specified by the information described in the authentication module setting file 504 (S105). Accordingly, the authentication module 503 corresponding to the authentication module setting file 504 selected in step S102 is invoked. Note that in this case the authentication information input by the user is also informed to the authentication module 503.

Then, the authentication module 503 performs the authentication based on the authentication information and returns its results to the authentication unit 502 (S106). Note that authentication methods are different depending on the implementation of the authentication modules 503. The authentication results are informed to the user via the authentication request unit 501, etc.

Figure 5:
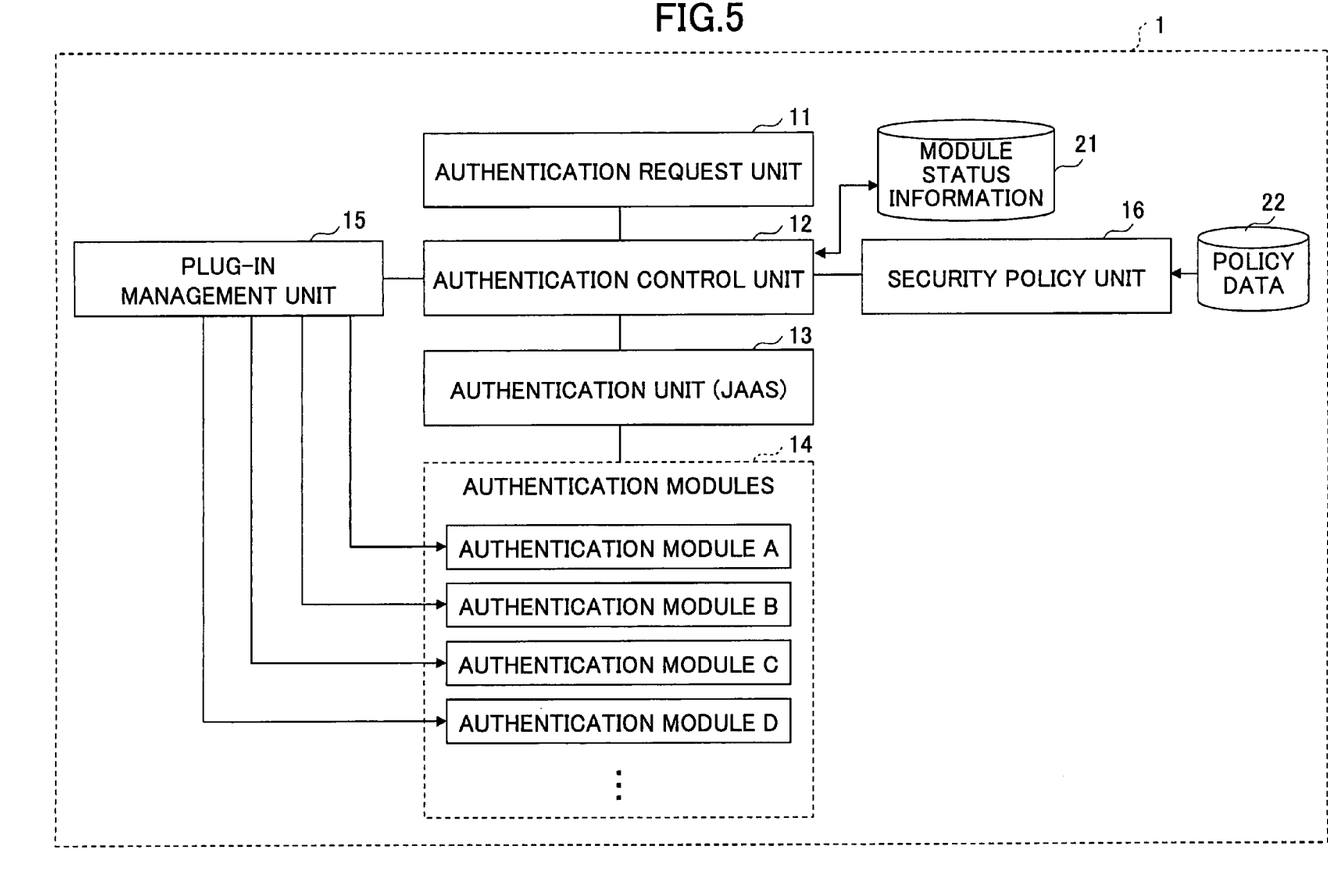
FIG. 5 is a diagram showing a configuration example of the authentication function of the multi-function machine according to a first embodiment.

In consideration of the above authentication processing, the authentication function of the multi-function machine 1 is described. FIG. 5 is a diagram showing a configuration example of the authentication function of the multi-function machine according to a first embodiment. In FIG. 5, the authentication function of the multi-function machine 1 is composed of an authentication request unit 11, an authentication control unit 12, an authentication unit 13, an authentication module 14, a plug-in management unit 15, a security policy unit 16, module status information 21, policy data 22, etc. Each of the units other than the module status information 21 and the policy data 22 is implemented as the JAR file 105 or the bundle 104. When the authentication module 14 is dynamically installed, it may be implemented as the bundle 104.

In FIG. 5, the authentication unit 13 corresponds to the JAAS. Accordingly, the authentication module 14 represents the implementation of authentication processing capable of being plugged in. Here, the four authentication modules 14 of authentication modules A, B, C, and D, which perform the authentication processing with different authentication methods, are exemplified.

The authentication request unit 11 receives an authentication request and requests processing corresponding to the authentication request from the authentication control unit 12. The authentication control unit 12 selects the authentication modules 14 used for the authentication processing in accordance with information constituting the mode (including conditions at the time of authentication) of the authentication request, and then requests the authentication with the authentication modules from the authentication unit 13.

The plug-in management unit 15 controls the installation and uninstallation processing of the authentication modules 14. The security policy unit 16 determines the authentication modules 14 to be used based on the policy data 22. The policy data 22 are data storing information for identifying the authentication modules 14 to be selected (used) in accordance with the information constituting the mode of the authentication request (i.e., corresponding information between the information constituting the mode of the authentication request and the authentication modules 14 to be used), and are stored, for example, in the HDD 633.

Figure 6:
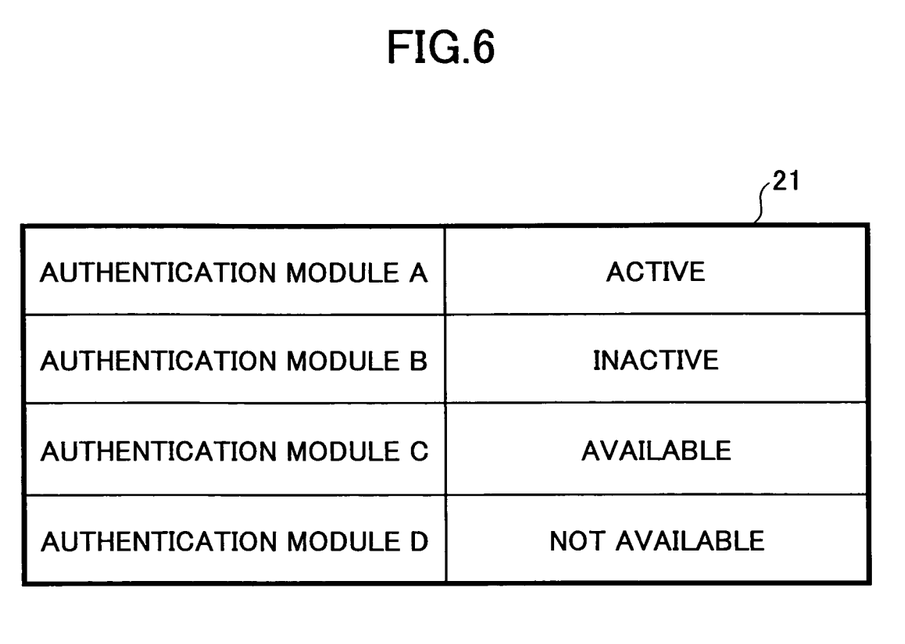
FIG. 6 is a diagram showing a configuration example of module status information.

The module status information 21 indicates the statuses of the authentication modules and is stored, for example, in the HDD 633. FIG. 6 is a diagram showing a configuration example of module status information.

As shown in FIG. 6, the module status information 21 is composed of information indicating statuses (such as "active," "inactive," "available," and "not available") of the respective authentication modules 14. In FIG. 6, the status represented as "active" is a status in which the authentication module A has been installed in the multi-function machine 1 and may be used normally. Furthermore, the status represented as "inactive" is a status in which the authentication module B has been installed in the multi-function machine 1 but cannot be temporarily used for any reason such as failures in the authentication module 14. Furthermore, the status represented as "available" is a status in which the authentication module C has not been installed in the multi-function machine 1 but is capable of being installed. Furthermore, the status represented as "not available" is a status in which the authentication module D has not been installed in the multi-function machine 1 and is not permitted to be installed.

Figure 7:
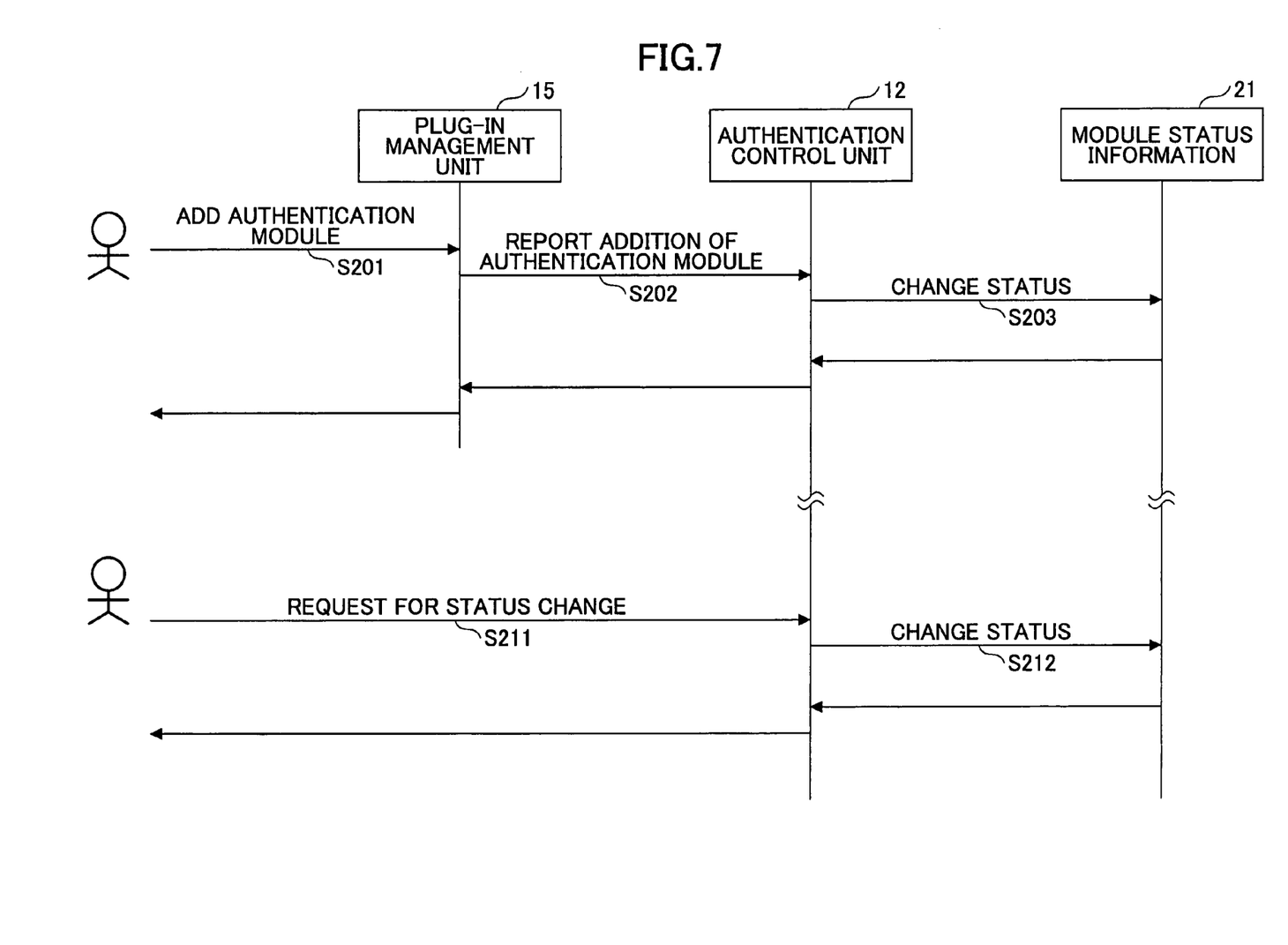
FIG. 7 is a sequence diagram for illustrating processing procedures for updating module status information according to the first embodiment.

Note that in the first embodiment, the module status information 21 is managed by the authentication control unit 12 and updated in accordance with the processing procedures described below. FIG. 7 is a sequence diagram for illustrating the processing procedures for updating the module status information according to the first embodiment.

For example, when the authentication module 14 is additionally installed in the multi-function machine 1 by the plug-in management unit 15 in accordance with instructions manually issued by an administrator or an automatic request (S201), the plug-in management unit 15 informs the authentication control unit 12 of the addition of the new authentication module 14 (S202). In accordance with the information from the plug-in management unit 15, the authentication control unit 12 updates the module status information 21 with the status of the added authentication module 14 set as "active" (S203).

Furthermore, when the status of the authentication module 14 set as either "active" or "available" is changed to either "inactive" or "not available," or when the status of the authentication module 14 set as either "inactive" or "not available" is changed to either "active" or "available," processing after step S211 is executed.

For example, when the administrator inputs instructions for setting the status of the specific authentication module 14 as either "inactive" or "not available" through the operations panel 602 (S211), the authentication control unit 12 regards the status of the authentication module 14 as a designated status and updates the module status information 21 (S212).

Figure 8:
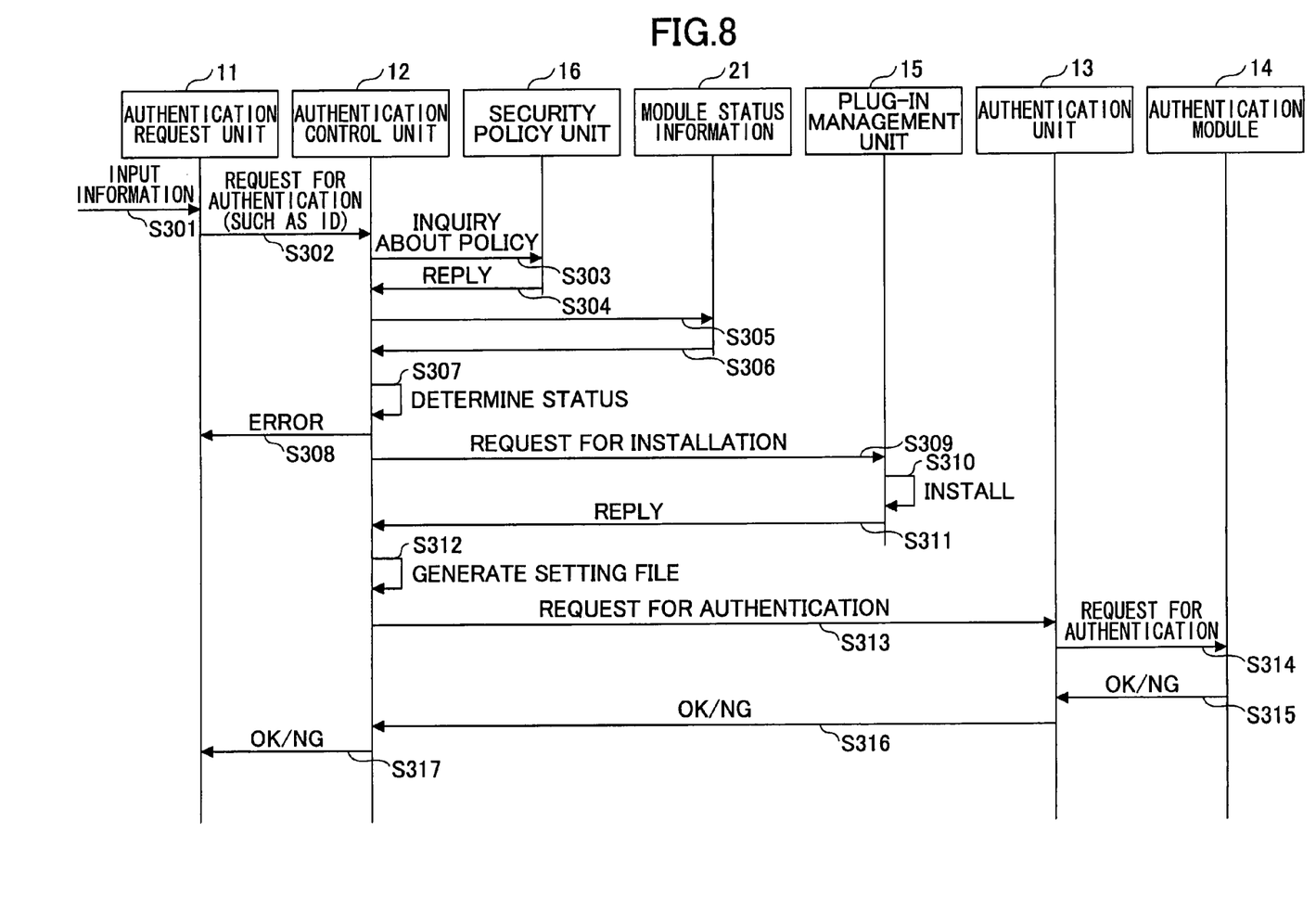
FIG. 8 is a sequence diagram for illustrating the processing procedures of the authentication processing according to the first embodiment.

Next, the authentication processing is described. FIG. 8 is a sequence diagram for illustrating the processing procedures of the authentication processing according to the first embodiment.

For example, the authentication request unit 11 receives the input of information such as a user name, a user ID, a group name, and a group ID (hereinafter referred to as "user identification information") for identifying an operator through a screen, etc., displayed on the operations panel 602 (S301). At this stage, information such as a password and biometric information for identifying the operator is not necessarily input. This is because each authentication module 14 receives the input of such information.

Then, using the input user identification information as an argument, the authentication request unit 12 requests the authentication from the authentication control unit 12 (S302). Next, using the user identification information or identification information such as a job title specified based on the user identification information as an argument, the authentication control unit 12 inquires of the security policy unit 16 about the authentication module 14 to be used (inquiry about policy) (S303). The security policy unit 16 determines the authentication module 14 to be used based on the policy data 22 and returns determination results (identification information of the authentication module 14 to be used) to the authentication control unit 12 (S304).

Figure 9:
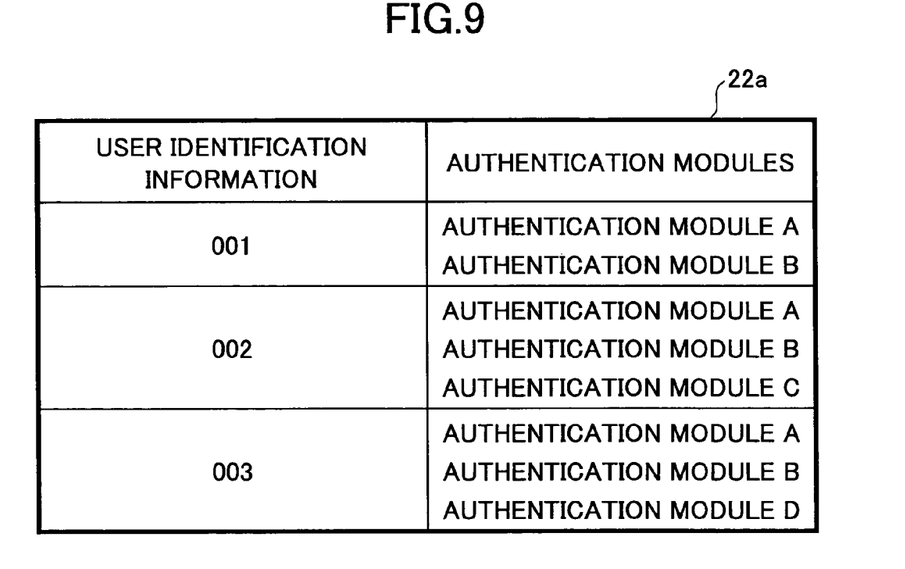
FIG. 9 is a diagram showing a first example of policy data.

FIG. 9 is a diagram showing a first example of the policy data. In policy data 22a shown in FIG. 9, the authentication modules 14 to be used are defined for respective user identification information. According to the policy data 22a, it is determined that the user (user 001) whose identification information is "001" is required to be authenticated by the authentication modules A and B. Furthermore, it is determined that the user 002 is required to be authenticated by the authentication modules A, B, and C. Furthermore, it is determined that the user 003 is required to be authenticated by the authentication modules A, B, and D. Assuming that the authentication module D is an authentication method that assures a higher level of security than the authentication module C does, the level of security increases in this order of the users 001, 002, and 003. Such policy data 22a are effective if the user 001 is a director or a section chief, the user 002 is a regular employee, and the user 003 is a part-time worker.

Figure 10:
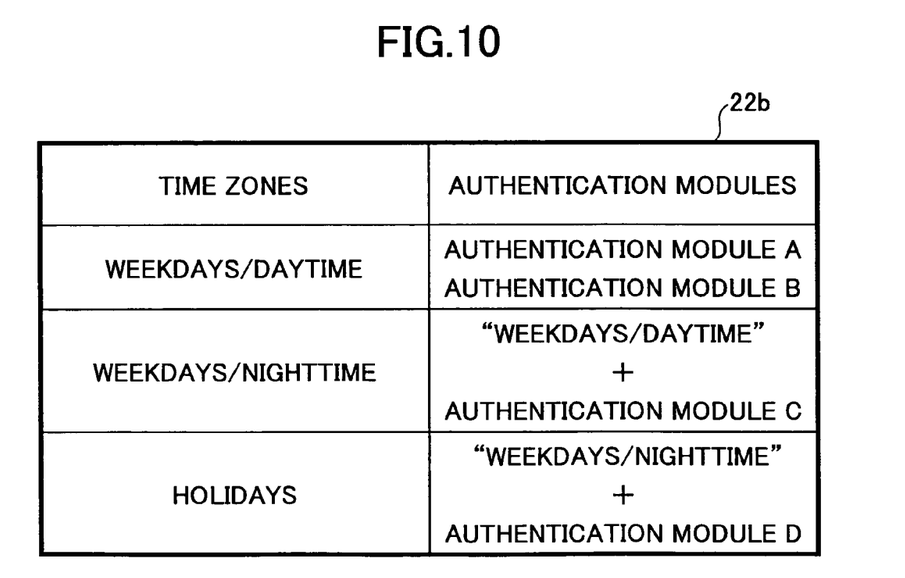
FIG. 10 is a diagram showing a second example of the policy data.

Furthermore, FIG. 10 is a diagram showing a second example of the policy data. In policy data 22b shown in FIG. 10, the authentication modules 14 to be used are defined for respective time zones. According to the policy data 22b, it is determined that during the daytime on weekdays the user is required to be authenticated by the authentication modules A and B. Furthermore, it is determined that during the nighttime on weekdays the user is required to be authenticated by the authentication module C in addition to the authentication modules 14 (authentication modules A and B) which are required for performing the authentication during the daytime on weekdays. Furthermore, it is determined that on holidays the user is required to be authenticated by the authentication module D in addition to the authentication modules 14 (authentication modules A, B, and C) which are required for performing the authentication during the nighttime on weekdays. Note that the time zones may be determined based on time of the timer provided in the multi-function machine 1 and corresponding information between the time and time zones registered in advance in the HDD 633, etc.

By the way, in the case of the policy data 22b shown in FIG. 10, the user identification information is not required for determining the authentication modules 14 to be used. Accordingly, in this case, the user identification information is not required to be input in step S101. For example, it is only necessary to inform that the operator starts performing an operation.

Furthermore, it is possible to combine plural of the policy data 22 together. As to this embodiment of the present invention, the policy data 22a and the policy data 22b may be combined together. In this case, for example, it may be determined that the authentication modules 14 related to AND or OR of the plural policy data 22 should be used.

Next, the authentication control unit 12 acquires from the module status information 21 the status information of the respective authentication modules 14 determined to be used (S305 and S306), and determines whether the statuses of the respective authentication modules 14 are either "active" or "available" (S307). Here, if any of the statuses of the respective authentication modules 14 is either "inactive" or "not available," the authentication control unit 12 returns an error to the authentication request unit 11 (S308). In this case, the authentication is not performed, and the multi-function machine 1 cannot receive an operating request from the operator.

Furthermore, if the authentication module 14 in "available" state exists, the authentication control unit 12 requests the installation of the authentication module 14 from the plug-in management unit 15 (S309). The plug-in management unit 15 installs the bundle of the authentication module 14 in the OSGi framework 103 (S310) and returns the success and failure of the installation to the authentication control unit 12 (S311). As for the installation of the authentication module 14, the operator may specify the acquisition source (such as a URL (Uniform Resource Locator) on networks and a SD card inserted into the multi-function machine 1) of the authentication module 14. For example, the plug-in management unit 15 may perform the installation based on information input on an installation screen after causing the installation screen to be displayed on the operations panel 602. Furthermore, if the acquisition source is capable of being specified in advance for each of the authentication modules 14, information indicating the acquisition source may be registered in the HDD 633. In this case, the plug-in management unit 15 may automatically acquire the authentication module 14 based on the information. Note that if the installation fails, the authentication control unit 12 returns an error to the authentication request unit 11. As a result, the authentication processing is stopped. On the other hand, if the installation is successful, the status of the authentication module 14 is set as "active."

Then, in processing from steps S312 through S316, each of the authentication modules 14 to be used is subjected to processing, and the processing is repeatedly carried out (loop interaction). First, in step S312, the authentication control unit 12 automatically generates an authentication module setting file (used synonymously with the authentication module setting file 504 shown in FIG. 3) related to the authentication module 14 to be subjected to the processing in accordance with a predetermined format (S312). Next, the authentication control unit 12 requests the authentication from the authentication unit 13 (S313). At this time, the file name of the automatically generated authentication module setting file, etc., are informed to the authentication unit 13.

Then, the authentication unit 13 refers to the authentication module setting file related to the informed file name and requests the authentication from the authentication module 14 specified by the information described in the authentication module setting file (S314). Next, the authentication module 14 performs the authentication based on authentication information and returns its results to the authentication unit 13 (S315). Before performing the authentication, the authentication module 14 displays a message prompting the user to input authentication information on the operations panel 602 in accordance with its implementation or receives authentication information from specified devices (such as the operations panel 602 for inputting a password, an IC-card reader for reading data with an IC card, and a device for reading biometric information).

Then, the authentication unit 13 returns the authentication results by the authentication module 14 to the authentication control unit 12 (S316). When the processing from steps S312 through S316 is completed with respect to the respective authentication modules 14 to be used, the authentication control unit 12 returns the authentication results to the authentication request unit 11 (S317). In accordance with operations, the authentication may be determined to be successful when the authentication is determined to be successful by all the authentication modules 14 to be used (AND authentication), or it may be determined to be successful when the authentication is determined to be successful by at least one of the authentication modules 14 (OR authentication). In the case of the AND authentication, the authentication control unit 12 may stop the loop processing when an authentication failure is returned from one of the authentication modules 14 and inform the authentication request unit 11 of the authentication failure.

In the above first embodiment, the module status information 21 is managed by the authentication control unit 12. However, it may be managed by the plug-in management unit 15. Next, such a mode is described as a second embodiment.

Figure 11:
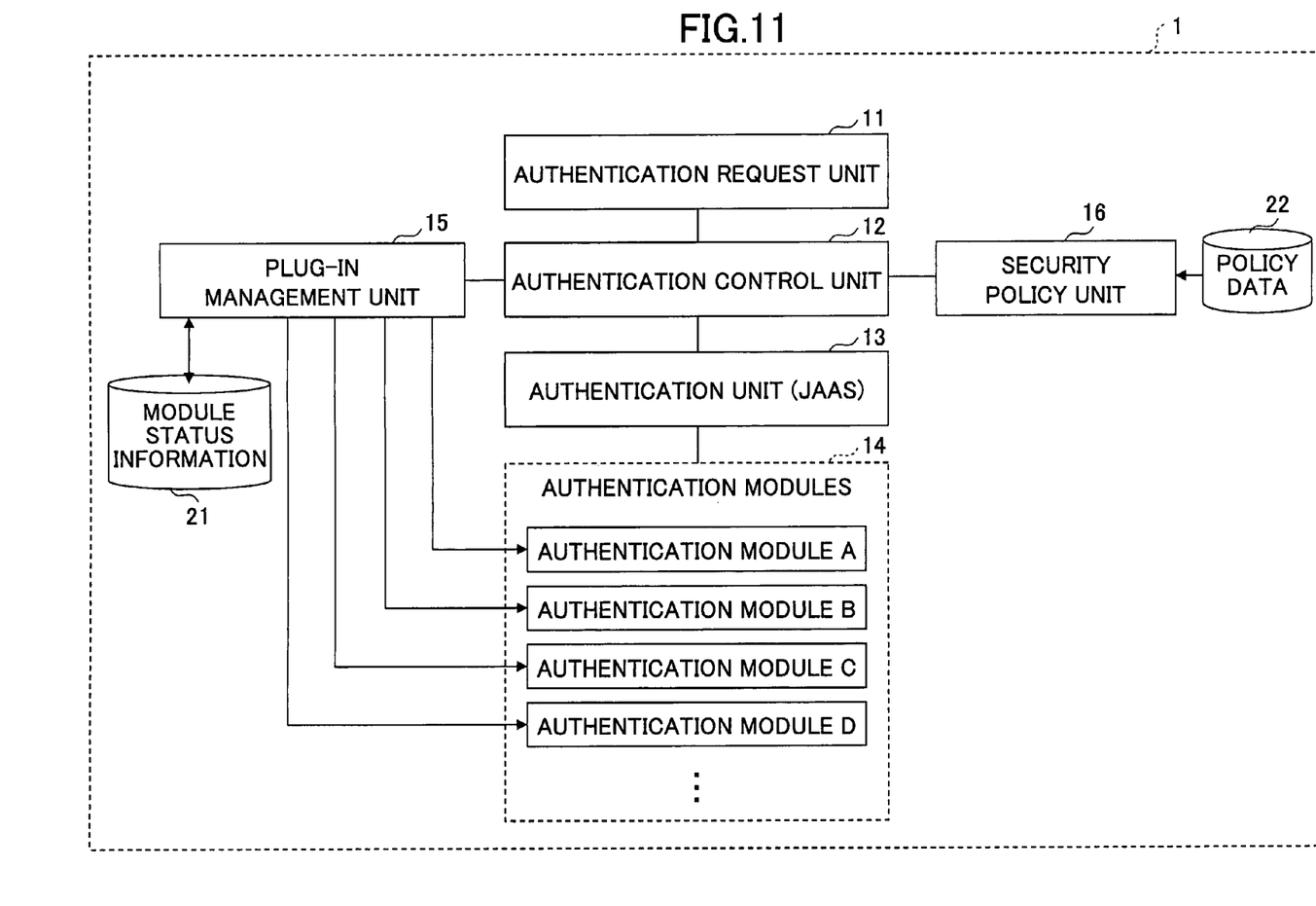
FIG. 11 is a diagram showing a configuration example of the authentication function of a multi-function machine according to a second embodiment.

FIG. 11 is a diagram showing a configuration example of the authentication function of a multi-function machine according to the second embodiment. In FIG. 11, components the same as those shown in FIG. 5 are denoted by the same reference numerals. FIG. 11 is different from FIG. 5 in that the module status information 21 is managed by the plug-in management unit 15. Due to a difference in the configuration, respective processing procedures are different from those of the first embodiment.

Figure 12:
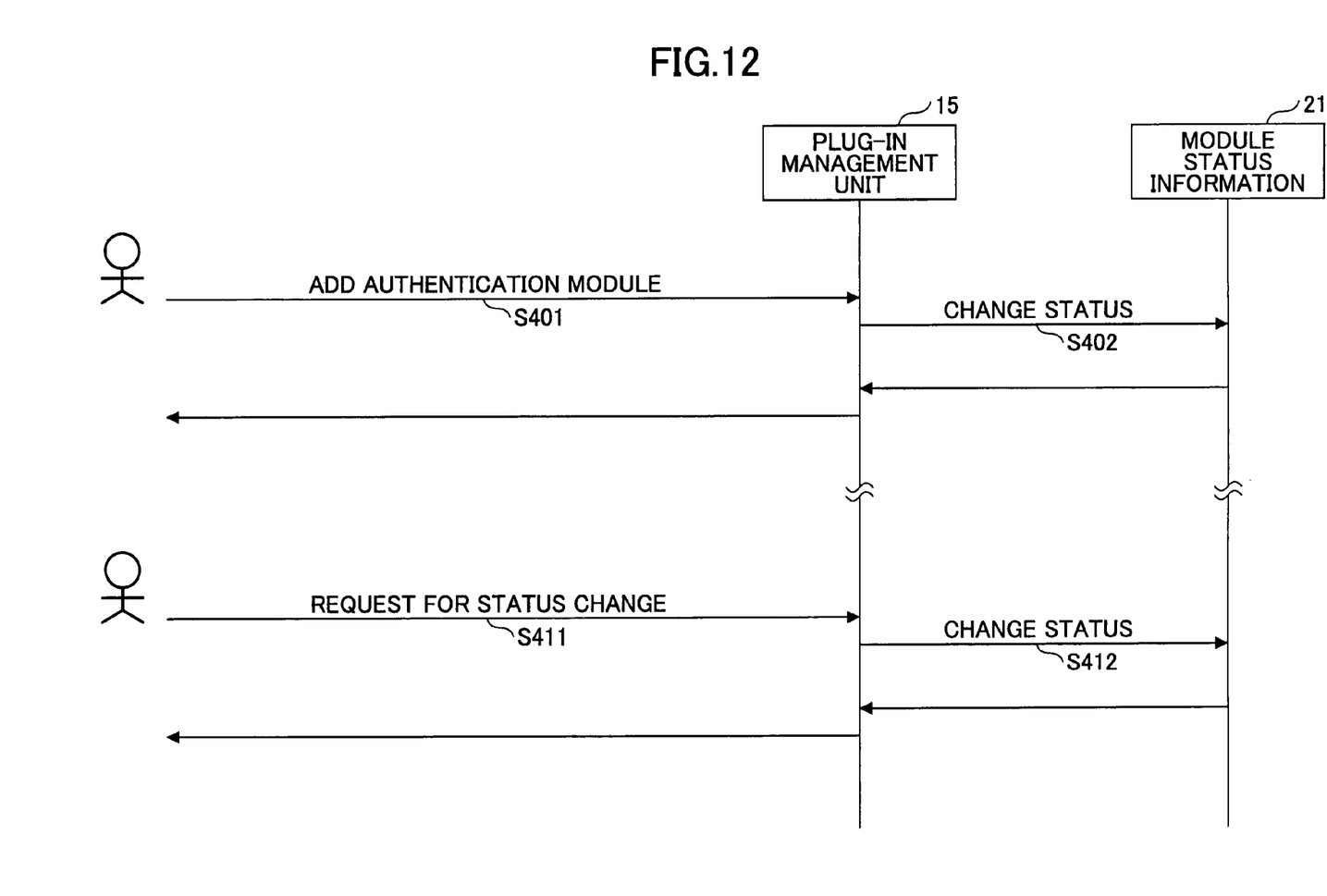
FIG. 12 is a sequence diagram for illustrating the processing procedures for updating module status information according to the second embodiment.

FIG. 12 is a sequence diagram for illustrating the processing procedures for updating module status information according to the second embodiment.

For example, when the authentication module 14 is additionally installed in the multi-function machine 1 in accordance with instructions manually issued by an administrator or an automatic request (S401), the plug-in management unit 15 updates the module status information 21 with the status set as "active" (S402).

Furthermore, when the status of the authentication module 14 set as either "active" or "available" is changed to either "inactive" or "not available," or when the status of the authentication module 14 set as either "inactive" or "not available" is changed to either "active" or "available," processing after step S411 is executed.

For example, when the administrator inputs instructions for setting the status of the specific authentication module 14 as either "inactive" or "not available" through the operations panel 602 (S411), the plug-in management unit 15 regards the status of the authentication module 14 as a designated status and updates the module status information 21 (S412).

Figure 13:
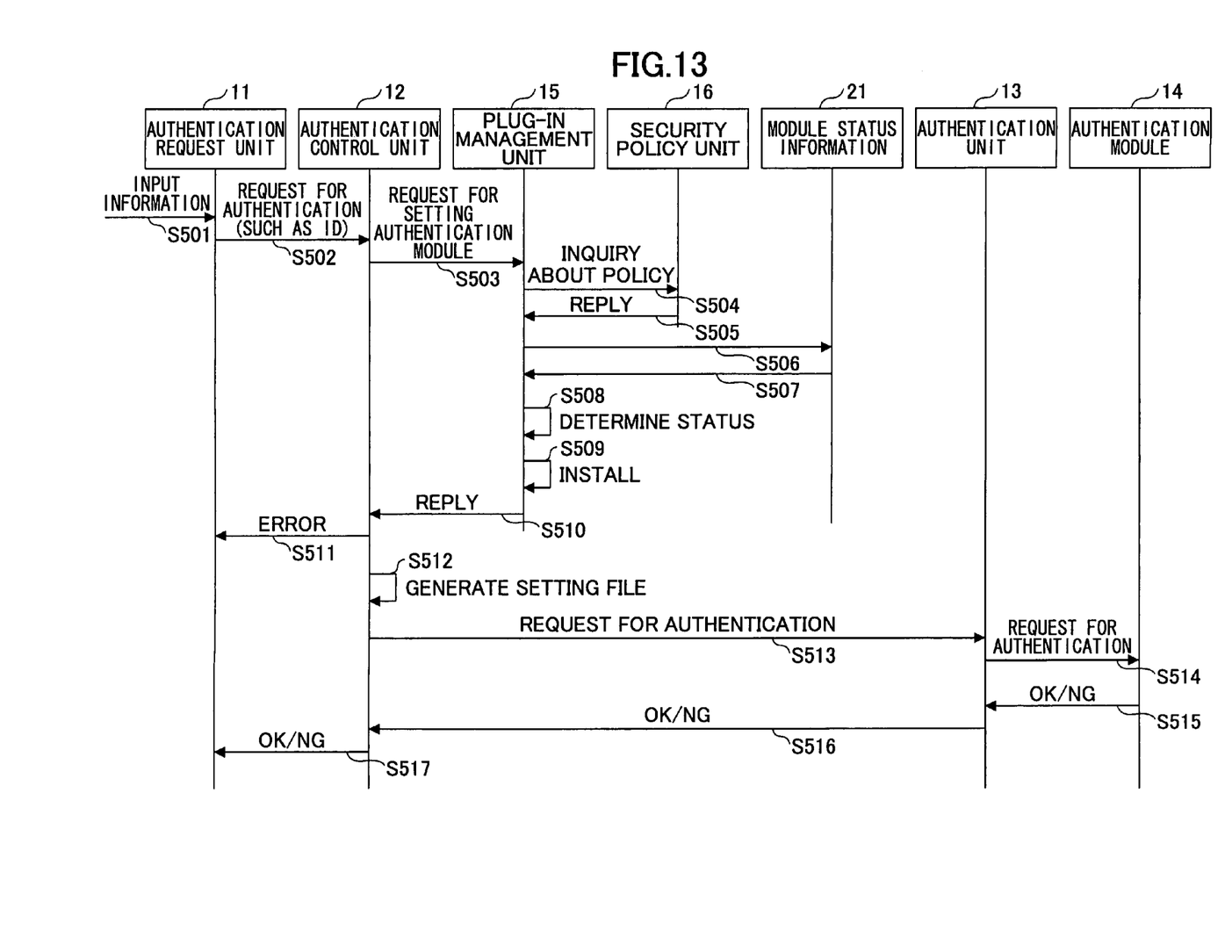
FIG. 13 is a sequence diagram for illustrating the processing procedures of the authentication processing according to the second embodiment.

Next, the authentication processing is described. FIG. 13 is a sequence diagram for illustrating the processing procedures of the authentication processing according to the second embodiment.

Steps S501 and S502 are the same as steps S301 and S302 shown in FIG. 8. After step S302, using the user identification information as an argument, the authentication control unit 12 requests the setting of the authentication module 14 (setting the status of the authentication module 14 to be used as "active") from the plug-in management unit 15 (S503).

Then, steps S504 through S508 shown in FIG. 13 are the same as steps S303 through S307 shown in FIG. 8. However, the processing executed by the authentication control unit 12 in steps S303 through S307 in the first embodiment is executed by the plug-in management unit 15 in the second embodiment (FIG. 13).

After step S508, the plug-in management unit 15 installs the bundle of the authentication module 14 in "available" state in the OSGi framework 103 (S509) and informs the authentication control unit 12 of the results of setting the authentication module 14 (S510). If the informed results indicate that any one of the statuses of the authentication modules 14 to be used is "inactive" or "not available" or the installation of the authentication module 14 has failed, the authentication control unit 12 returns an error to the authentication request unit 11 (S511).

When the setting of the authentication module 14 is normally completed, the plug-in management unit 15 returns a list of the authentication modules 14 to be used to the authentication control unit 12 in step S510. After this, the processing of steps S512 through S517 the same as those of steps S312 through S317 shown in FIG. 8 is applied to the authentication modules 14 related to the list.

As described above, according to the multi-function machine 1 of the embodiments of the present invention, the authentication module 14 to be used can be dynamically changed depending on the mode of the authentication request. Accordingly, the authentication with the different authentication methods can be performed depending on the user identification information, the time zones, etc. Furthermore, when it is necessary to perform the authentication with the authentication module 14 that is not prepared at the time of the authentication request, the authentication module 14 is dynamically installed to continue the authentication processing. Accordingly, it is possible to reduce the likelihood of interrupting the authentication processing due to the absence of the authentication module 14.

Note that the information constituting the mode of the authentication request is not limited to the user identification information and the time zones. For example, it may be replaced by programs and functions required to be used according to the operator.

Furthermore, the above embodiments describe the case using the authentication module setting file. However, in the JAAS, the authentication module 14 is not necessarily designated by the authentication module setting file. Instead, the information stored in the authentication module setting file may be transmitted to (set in) the JAAS using a predetermined class of an instance. Accordingly, the embodiments of the present invention may be realized according to this structure.

The present invention is not limited to the specifically disclosed embodiments, and variations and modifications may be made without departing from the scope of the present invention.

The present application is based on Japanese Priority Application No. 2008-038827 filed on Feb. 20, 2008, the entire contents of which are hereby incorporated herein by reference.

What is claimed is:

1. A multifunction machine including an authentication control apparatus, the authentication control apparatus comprising:
plural authentication hardware to authenticate an operator with different authentication methods; a corresponding information management hardware to manage corresponding information between a mode of an authentication request and an authentication hardware to be used, to manage the corresponding information between the operator and the authentication hardware to be used and to manage the corresponding information between operator identification numbers and the authentication hardware to be used; and an authentication control hardware to determine an authentication hardware corresponding to the mode of the authentication request based on the corresponding information in response to the authentication request, to determine the authentication hardware corresponding to the operator based on the corresponding information in response to the authentication request from the operator, to determine the authentication hardware corresponding to the operator identification number based on the corresponding information in response to the authentication request and to cause the determined authentication hardware to execute the authentication for the operator; and wherein the corresponding information management hardware manages the corresponding information between a time zone and the authentication hardware to be used, and the authentication control hardware determines the authentication hardware corresponding to the time zone at which the authentication request is made based on the corresponding information in response to the authentication request from the operator.

2. The authentication control apparatus according to claim 1, further comprising: a status management hardware to manage status information capable of identifying whether installation is completed for each of the authentication hardware; and an installation hardware to install a program related to the authentication hardware determined based on the corresponding information when the program is determined not to be installed based on the status information.

3. The authentication control apparatus according to claim 2, wherein the authentication control hardware causes the authentication hardware related to the program installed by the installation hardware to execute the authentication in accordance with the authentication request.

4. An authentication control method executed by a computer having plural authentication units that perform authentication for an operator with different authentication methods, the authentication control method comprising: determining, by the computer, the authentication unit corresponding to a mode of an authentication request based on corresponding information between the mode of the authentication request and the authentication unit to be used, which is managed by a corresponding information management unit, in response to the authentication request from the operator; determining, by the computer, the authentication unit corresponding to the operator based on the corresponding information in response to the authentication request from the operator; managing, by the computer, the corresponding information between the operator and the authentication unit to be used; managing, by the computer, the corresponding information between operator identification numbers and the authentication unit to be used; determining, by the computer, the authentication unit corresponding to the operator identification number based on the corresponding information in response to the authentication request; and causing, by the computer, the determined authentication unit to execute the authentication for the operator; and wherein the corresponding information management unit manages the corresponding information between a time zone and the authentication unit to be used, and in the determination step, the authentication unit corresponding to the time zone at which the authentication request is made is determined based on the corresponding information in response to the authentication request from the operator.

5. The authentication control method according to claim 4, further comprising:
an installation step of installing a program related to the authentication unit determined in the determination step when the program is determined not to be installed based on a status management unit that manages status information capable of identifying whether installation is completed for each of the authentication units.

6. The authentication control method according to claim 5, wherein, in the execution step, the authentication unit related to the program installed by the installation unit is caused to execute the authentication in accordance with the authentication request.

7. A non-transitory recording medium having a program that causes a computer to execute an authentication control method executed by a computer having plural authentication units that perform authentication for an operator with different authentication methods, the authentication control method comprising:

a determination step of determining the authentication unit corresponding to a mode of an authentication request based on corresponding information between the mode of the authentication request and the authentication unit to be used, managed by a corresponding information management unit, in response to the authentication request from the operator; determining, by the computer, the authentication unit corresponding to the operator based on the corresponding information in response to the authentication request from the operator; managing, by the computer, the corresponding information between the operator and the authentication unit to be used; managing, by the computer, the corresponding information between operator identification numbers and the authentication unit to be used; determining, by the computer, the authentication unit corresponding to the operator identification number based on the corresponding information in response to the authentication request; and causing, by the computer, the determined authentication unit to execute the authentication for the operator; and wherein the corresponding information management unit manages the corresponding information between a time zone and the authentication unit to be used, and in the determination step, the authentication unit corresponding to the time zone at which the authentication request is made is determined based on the corresponding information in response to the authentication request from the operator.

\* \* \* \* \*